United States Patent
Bourbiaux et al.

(10) Patent No.: US 10,872,182 B2
(45) Date of Patent: Dec. 22, 2020

(54) METHOD FOR THE DEVELOPMENT OF A FLUID DEPOSIT TRAVERSED BY FRACTURES BY MEANS OF A FLOW SIMULATION BASED ON AN EXCHANGE FLOW AND A CORRECTIVE FACTOR

(71) Applicant: IFP Energies nouvelles, Rueil-Malmaison (FR)

(72) Inventors: Bernard Bourbiaux, Rueil Malmaison (FR); Didier Yu Ding, Le Pecq (FR)

(73) Assignee: IFP ENERGIES NOUVELLES, Rueil-Malmaison (FR)

(*) Notice: Subject to any disclaimer, the term of this patent is extended or adjusted under 35 U.S.C. 154(b) by 639 days.

(21) Appl. No.: 15/416,646

(22) Filed: Jan. 26, 2017

(65) Prior Publication Data
US 2017/0212973 A1 Jul. 27, 2017

(30) Foreign Application Priority Data
Jan. 26, 2016 (FR) ...................... 16 50582

(51) Int. Cl.
| | | |
|---|---|---|
| G06F 30/20 | (2020.01) | |
| E21B 49/00 | (2006.01) | |
| G06F 17/11 | (2006.01) | |
| G06F 111/10 | (2020.01) | |

(52) U.S. Cl.
CPC .............. *G06F 30/20* (2020.01); *E21B 49/00* (2013.01); *G06F 17/11* (2013.01); *G06F 2111/10* (2020.01)

(58) Field of Classification Search
CPC .. G06F 17/5009; G06F 17/11; G06F 2217/16; E21B 49/00

USPC ............................................................. 703/2
See application file for complete search history.

(56) References Cited

U.S. PATENT DOCUMENTS

| | | | |
|---|---|---|---|
| 6,064,944 A | 5/2000 | Sarda et al. | |
| 8,386,225 B2 | 2/2013 | Bourbiaux | |
| 2008/0133186 A1* | 6/2008 | Li ...................... | G06F 17/5018 703/2 |

(Continued)

FOREIGN PATENT DOCUMENTS

| | | |
|---|---|---|
| FR | 2 757 957 A1 | 7/1998 |
| FR | 3 007 165 A1 | 12/2014 |

OTHER PUBLICATIONS

Thomas A. Blasingame, "Petroleum Engineering 663—Formation Evaluation and Analysis of Reservoir Performance Self-Study Guide (tied to Course Notes)—Analysis of Reservoir Performance", Jul. 22, 2013, pp. 1-161 (Year: 2013).*

(Continued)

*Primary Examiner* — Justin C Mikowski
(74) *Attorney, Agent, or Firm* — Fitch, Even, Tabin & Flannery LLP

(57) ABSTRACT

The present invention relates to a method for optimizing a fluid deposit traversed by a fracture network. For this method, the deposit is discretized in a meshed representation, a "dual medium" approach is used, and the exchange flows are determined between the meshes, together with corrective factors. The corrective factors are dependent on the initial pressure and the minimum production pressure of the deposit. The fluid flows in the deposit are simulated by means of these flows and these corrective factors.

20 Claims, 2 Drawing Sheets

(56) References Cited

U.S. PATENT DOCUMENTS

2014/0372042 A1* 12/2014 Bourbiaux .............. E21B 43/00
702/12

OTHER PUBLICATIONS

S. H. Lee et. al., Hierarchical modeling of flow in naturally fractured formations with multiple length scales, Water Resources Research, vol. 37, No. 3, p. 443-455, Mar. 2001. (Year: 2001).*
Fikri Kuchuk, SPE, and Denis Biryukov, Schlumberger, Pressure Transient Tests and Flow Regimes in Fractured Reservoirs, Copyright 2013, Society of Petroleum Engineers, SPE Annual Technical Conference and Exhibition held in New Orleans, Louisiana, USA, Sep. 30-Oct. 2, 2013, SPE 166296, pp. 1-24. (Year: 2013).*
J.E. Warren et al., "The Behavior of Naturally Fractured Reservoirs", SPE Journal (Sep. 1963), pp. 245-255.
H. Kazemi et al., "Numerical Simulation of Water-Oil Flow in Naturally Fractured Reservoirs", SPE Journal (Dec. 1976), pp. 317-326.

* cited by examiner

METHOD FOR THE DEVELOPMENT OF A
FLUID DEPOSIT TRAVERSED BY
FRACTURES BY MEANS OF A FLOW
SIMULATION BASED ON AN EXCHANGE
FLOW AND A CORRECTIVE FACTOR

CROSS-REFERENCE TO RELATED
APPLICATIONS

Reference is made to French Application No. 16/50.582 filed Jan. 26, 2016, which is hereby incorporated herein by reference in its entirety.

BACKGROUND OF THE INVENTION

Field of the Invention

The present invention relates to the field of developing underground deposits, such as hydrocarbon deposits, notably those comprising a fracture network. The method according to the invention, relates to the study of the hydraulic properties of fractured terrains, and notably for studying the movements of hydrocarbons in underground deposits and in particular, a method predicts fluid flows likely to occur through the medium, for simulating a production of hydrocarbons according to various production scenarios.

Description of the Prior Art

The petroleum industry, and more precisely the exploration and development of petroleum deposits in particular, require a as complete as possible knowledge of the underground geology for efficiently providing an evaluation of reserves, a modeling of production or development management. Indeed, determining the location of a production well or an injection well, the composition of the drilling mud, the completion characteristics, choosing a method of recovering hydrocarbons (such as water injection, for example) and the parameters necessary for the implementation of this method (such as injection pressure, production rate, etc.) require good knowledge of the deposit. Knowledge of the deposit notably is knowledge of the petrophysical properties of the subsoil at any point in space.

Accordingly, for some time the petroleum industry has combined field (in situ) measurements with experimental modeling (performed in the laboratory) and/or numerical modeling (by means of software). Petroleum deposit modeling thus constitutes a technical step essential to any deposit exploration or development. The purpose of this modeling is to provide a description of the deposit.

Fissured reservoirs constitute an extreme type of heterogeneous reservoirs comprising two contrasting media which are a matrix medium containing the major part of the oil in place and displaying low permeability and a fissured medium representing less than 1% of the oil in place which is highly conductive. The fissured medium itself may be complex, with different sets of fissures characterized by their respective density, length, orientation, inclination and opening.

The engineers responsible for the development of fractured reservoirs need to know the role of the fractures as perfectly as possible. What is referred to as a "fracture" is a plane of discontinuity of very small thickness in relation to its extent, representing a rupture plane in a rock of the deposit. On the one hand, knowledge of the distribution and behavior of these fractures can be used to optimize the location and the spacing between the wells to be drilled through the petroleum-bearing deposit. On the other hand, the geometry of the fracture network conditions fluid displacement, both at the reservoir scale and at the local scale where it determines the elementary matrix blocks in which the oil is trapped. Knowing the distribution of the fractures is therefore very useful, as well as at a later stage, for calibrating the models constructed to simulate deposits in order to reproduce or to predict past or future production curves for them. For these purposes, three-dimensional images of deposits are used for locating a large number of fractures.

Thus, for reproducing or predicting (i.e. "simulating") the production of hydrocarbons upon starting production from a deposit according to a given production scenario (characterized by the position of the wells, the recovery method, etc.), calculations are made with software, called a "reservoir simulator" (or "flow simulator"), which calculates the flows and the evolution in pressure within the reservoir. The results of these calculations allowing prediction and optimization of the deposit in terms of flow rate and/or quantity of recovered hydrocarbons. Calculating the behavior of the reservoir according to a given production scenario constitutes a "reservoir simulation."

A method is known for optimizing development of a fluid deposit traversed by a fracture network, in which fluid flows in the deposit are simulated by a simplified but realistic modeling of the deposit. This simplified representation is termed a "dual medium approach", and is proposed by Warren J. E. et al. in "The Behavior of Naturally Fractured Reservoirs", SPE Journal (September 1963), 245-255. This technique consists in considering the fractured medium as two continua exchanging fluids with one another which are matrix blocks and fractures. This is referred to as a "dual medium" or a "dual porosity" model. Thus, the "dual medium" modeling of a fractured deposit discretizes the deposit into two superimposed sets of meshes (called grids), constituting the "fissure" grid and the "matrix" grid. Each elementary volume of the fractured deposit is thus conceptually represented by two meshes, one "fissure" and the other "matrix", coupled with one another (i.e. exchanging fluids). In the reality of the fractured field, these two meshes represent the set of matrix blocks defined by fractures present in this place in the reservoir. Indeed, most often, the meshes have lateral dimensions of a few hectometers (commonly 100 or 200 m) given the size of the fields and the limited possibilities of simulation software in terms of capacity and calculation time. It follows that, for most of the fractured fields, the elementary volume (mesh) of a fractured reservoir contains countless fractures forming a complex network defining multiple matrix blocks of variable dimensions and shapes according to the geological context. Each of the actual component blocks exchange fluids with the fractures that surround it at a rate (flow rate) that is specific to it since it depends on the dimensions and the shape of this particular block.

In the face of such a geometric complexity of the actual medium, the approach is for each elementary volume (mesh) of reservoir, to representing the actual fractured medium as a set of all identical, parallelepiped, matrix blocks, defined by an orthogonal, regular network of fractures oriented along the main directions of flow. Thus for each mesh a "representative" matrix block (of the actual (geological) distribution of the blocks) is defined that is unique and parallelepiped in shape. It is then possible to formulate and calculate the matrix-fissure exchange flows for this "representative" block, and to multiply the result thereof by the number of such blocks in the elementary volume (mesh) to obtain the flow at the scale of this mesh.

In the "single permeability" version of the dual medium model, the flow of fluids at the scale of the reservoir, is assumed to take place only via the fractures (that is just via the fracture grid), fluid exchanges occurring locally between the fractures and the matrix blocks (that is between the two meshes of a given pair of "fracture" and "matrix" meshes representing the fractured porous reservoir at a given place in the field). In the "dual permeability" version of this same model, the flow of fluids takes place within the two "fracture" and "matrix" media at the scale of the reservoir, still with local fracture-matrix exchanges of fluids occurring locally between the fractures and the matrix blocks.

Such a representation (modeling) of the actual (geological) fractured reservoir is used for reproducing, that is "simulating", the response (behavior) of the field when placed in production. To do this, flow or transfer equations are formulated, explained and solved for each of the constituent meshes of the model following the method summarized below. The set of mathematical equations applied to the dual medium representing the fractured reservoir constitutes the dual medium reservoir simulator as is well known.

On the basis of input data concerning on the one hand the two media (matrix and fracture), and on the other hand the fluids that this dual medium contains, a reservoir simulator can be used to determine, at various instants ("time increments") and in each mesh, values of various parameters quantifying a state of these two media such as saturations (in oil, gas, water), pressures, concentrations, temperatures, etc. This simulator solves two sets of equations with one set relating to the matrix medium, and the other regulating to the fractured medium. It should be noted that these equations express the mass (per constituent) and energy balances for each pair of "fracture" and "matrix" meshes representing an elementary volume of the actual porous fractured reservoir. These mass balances involve exchange flows between meshes of the same (fracture or matrix) medium nearby in space. The matrix-fissure exchange term forms the subject matter of the present invention with an optional injection or production term if a well traverses the elementary volume considered and a set of preceding flow terms being equal to the material or energy accumulation term of the mesh considered. Thus, the equations relating to the "matrix" medium and to the "fracture" medium at each point of the reservoir are coupled, via an exchange term, describing the exchange flows (of mass or energy) between the porous rock (matrix) and the fractures that traverse the matrix. This modeling of matrix-fracture exchanges is essential, since the matrix most often contains the bulk of the reserves to be produced.

The method adopted to date for formulating these matrix-fracture (or matrix-fissure) exchanges discretizes for each pair of fracture and matrix meshes the dual medium model:
  first to determine the dimensions of the identical (in dimensions and shape) matrix blocks assumed to be representative of the complex actual distribution of the blocks in this elementary reservoir volume; and
  then to formulate and calculate the matrix-fissure exchange flow according to the dimensions of this representative block thus calculated (this flow is then equal to the flow expressed for such a representative block multiplied by the number of such blocks in the mesh considered).

Thus, the exchange formulations adopted to date in fractured reservoir simulators, which rely on a very simplified representation of this type of reservoir, prove to be very approximate and unable to faithfully render all the exchange mechanisms liable to be involved, which include pressure diffusivity, capillarity, gravity, molecular diffusion, conduction and viscous forces.

Indeed, on the one hand, the exchange between matrix and fissure blocks is expressed at the scale of the (hectometric) mesh of the simulation model by considering that a matrix block of fixed dimensions and shape is representative of ("equivalent" to) the set of actual (geological) blocks of the mesh.

On the other hand, the exchange is assumed to be pseudo-permanent that is the exchange flow at limits of this equivalent block is proportional to the potential difference (for example the pressure difference, the temperature difference, etc.) between the two matrix and fissure media. For each medium, this potential (for example temperature) is assumed as being uniform within a given medium, therefore in the present case uniform (constant) within the representative block of the mesh being considered at the instant of simulation considered. However, the exchanges between fissures and blocks, notably if they involve several fluid phases, are not instantaneous. In addition, outside of the effects of gravity and viscous drag (by fracture flow), these exchanges relate first to the periphery of the blocks before spreading toward their center. This spatial non-uniformity in the change of state of the matrix blocks also induces a temporal (that is non-stationary, or transient) evolution, since the fluid in the fracture accesses the edges of the block much more quickly than its center. A faithful rendering of the change of state of the blocks would thus require discretizing the block in order to simulate the movement thereof at a local (intra-block) with scale, the resultant of these flows at the block-fracture border then constituting a much more accurate estimate of the matrix-fracture exchange over time.

For example, it should be noted that multiple expressions of this constant shape factor σ (that is solely dependent on the dimensions a, b, c of the block and independent of the variable solved by the simulator, such as the water saturation, for example) have been proposed in recent decades: The first of them was proposed by Kazemi et al. in 1976 (ref.: Kazemi, H., Merrill, L. S., Porterfield, K. L. and Zeman, P. R.: "Numerical Simulation of Water-Oil flow in Naturally Fractured Reservoirs", *SPE Journal* (December 1976) 317), which defines the constant shape factor in the following way:

$$\sigma = \frac{4}{a^2} + \frac{4}{b^2} + \frac{4}{c^2}.$$

In order to take into account the transient nature of the exchange flow, patent applications FR 2.925.726 A corresponding to U.S. Pat. No. 8,386,225, and FR 3.007.165 A corresponding to US 2014-0372042 describe a method, in which the transient exchange flows between the porous blocks and the fractures is determined by means of a shape function (also termed a shape factor). This method is suitable, for example notably for diphasic exchanges of low compressibility fluids such as exchanges by water-oil imbibition.

However, in the case of a matrix media of very low permeability, predicting the exchanges between matrix and fractures during the "short-time" or "transient" period (period during which "transient" exchanges are not yet pseudo-permanent) is very imprecise, and the duration of this transient period is lengthy. However, the usual models simulate both short-time and long-time production, while the behavior in short-time flow is not the same, which leads to significant errors for the fields whereof the very low permeability matrix blocks remain for a long time in this transient production state. With the methods of the prior art, it has proved impossible to reproduce reference forecasts (that is to reproduce simulations carried out by use of a "reference" model, that is finely meshing the matrix blocks) by use of a conventional dual medium simulator for fractured gas fields. In addition, it has not been possible to reproduce them by use of the same simulator incorporating improvements in the calculation of short-time transient exchanges.

SUMMARY OF THE INVENTION

For remedying these drawbacks, the present invention relates to a method for optimizing moderation from a fluid deposit traversed by a fracture network. For this method, the deposit is discretized in a meshed representation, with a "dual medium" approach, and the exchange flows are determined between the meshes, together with corrective factors. The corrective factors are dependent on the initial pressure and the minimum production pressure of the deposit. The fluid flows in the deposit are simulated by use of these flows and these corrective factors. Thus, it is possible to simulate, in a representative manner, the flows of any type of fluid (whether or not compressible), including in matrices of low permeability.

The invention relates to a method for the development of a fluid deposit traversed by a fracture network, in which, on a basis of measurements of properties relating to the deposit, a meshed representation of the deposit is constructed with each mesh of the representation comprising a matrix medium and a fractured medium, and in which the initial pressure of the deposit and the minimum production pressure of the deposit are known. The following steps are performed for this method:
  a) in each mesh an exchange flow is determined that takes place between the matrix medium and the fractured medium;
  b) a corrective factor of the exchange flow is determined by use of the initial pressure of the deposit and the minimum production pressure of the deposit;
  c) the flows of the fluid in the deposit are simulated by use of a flow simulator, the exchange flow and the corrective factor; and
  d) the development of the deposit is optimized by use of the simulation of the flows.

According to one embodiment of the invention, steps a) and b) are performed in this order, simultaneously or in the reverse order.

Advantageously, the corrective factor of the exchange flow is obtained by use of a formulation in pseudo-pressure of the flow equations of the fluid in the deposit.

In accordance with one implementation of the invention, the corrective factor is determined for transient exchange regimes.

According to a variant, the corrective factor for transient exchange regimes in one dimension $\beta_{m-1D}^{ST}(\overline{P})$ is written by a formula of the type:

$$\beta_{m-1D}^{ST}(\overline{P}) = \frac{\frac{P_{ref}}{\mu_{ref} Z_{ref}}}{\frac{\overline{P}}{\mu Z}} \frac{8}{\pi^3} \frac{(m_f - m_i)^2}{[P_f - \overline{P}][m(\overline{P}) - m_i]}$$

with
  $P_{ref}$ is a reference pressure;
  $\mu_{ref}$ is a viscosity at the reference pressure;
  $Z_{ref}$ is the compressibility factor of the fluid at the reference pressure;
  $\overline{P}$ is the average pressure of a matrix block of the matrix medium;
  $\mu$ is viscosity of the fluid at a pressure $\overline{P}$;
  $Z$ is a compressibility factor of the fluid at the pressure $\overline{P}$;
  $m_f$ is the pseudo-pressure at the final state;
  $m_i$ is the pseudo-pressure at an initial state of the reservoir;
  $P_f$ is the pressure of the reservoir at the final state; and
  $m(\overline{P})$ is an average pseudo-pressure of the matrix block defined as:

$$m(\overline{P}) = \frac{\mu_{ref} Z_{ref}}{P_{ref}} \int_{P_{ref}}^{\overline{P}} \frac{\overline{P}}{\mu Z} d\overline{P}.$$

As a variant, the corrective factor for transient exchange regimes in two dimensions $\beta_{m-2D}^{ST}(\overline{P})$ is written by a formula of the type: $\beta_{m-2D}^{ST}(\overline{P}) = SC \cdot \beta_{m-1D}^{ST}(\overline{P})$ with $$\beta_{m-1D}^{ST}(\overline{P}) = \frac{\frac{P_{ref}}{\mu_{ref} Z_{ref}}}{\frac{\overline{P}}{\mu Z}} \frac{8}{\pi^3} \frac{(m_f - m_i)^2}{[P_f - \overline{P}][m(\overline{P}) - m_i]} \text{ and}$$

$$SC = 1 + \left(\frac{\frac{1}{L_{eq}^{0\,2}}}{\frac{1}{L_{eq}^{LT\,2}}} - 1\right)\left[\frac{m - \frac{m_f + m_i}{2}}{m_i - \frac{m_f + m_i}{2}}\right]$$

with
  $P_{ref}$ is a reference pressure;
  $\mu_{ref}$ is viscosity at the reference pressure;
  $Z_{ref}$ is compressibility factor of the fluid at the reference pressure;
  $\overline{P}$ is average pressure of a matrix block of the matrix medium;
  $\mu$ is viscosity of the fluid at a pressure $\overline{P}$;
  $Z$ is a compressibility factor of the fluid at the pressure $\overline{P}$;
  $m_f$ is the pseudo-pressure at an final state;
  $m_i$ is the pseudo-pressure at an initial state of the reservoir;
  $P_f$ is the pressure of the reservoir at a final state;
  $m(\overline{P})$ is an average pseudo-pressure of the matrix block defined as:

$$m(\overline{P}) = \frac{\mu_{ref} Z_{ref}}{P_{ref}} \int_{P_{ref}}^{\overline{P}} \frac{\overline{P}}{\mu Z} d\overline{P},$$

$L_{eq}^{0}$ is an equivalent length of a matrix block of one dimension at the initial time of the transient regime; and
  $L_{eq}^{LT}$ is an equivalent length of a matrix block of one dimension at the final time of the transient regime.

In accordance with one implementation of the invention, the corrective factor is determined for pseudo-permanent exchange regimes.

According to a variant, the corrective factor for pseudo-permanent regimes is in one dimension $\beta_{m-1D}^{LT}(\overline{P})$ or in two dimensions $\beta_{m-2D}^{LT}(\overline{P})$ is written by a formula of the type:

$$\beta_{m-1D}^{LT}(\overline{P}) = \beta_{m-2D}^{LT}(\overline{P}) = \frac{\frac{P_{ref}}{\mu_{ref} Z_{ref}}}{\frac{\overline{P}}{\mu Z}} \frac{[m_f - m(\overline{P})]}{[P_f - \overline{P}]}$$

with $P_{ref}$ is a reference pressure;
$\mu_{ref}$ is viscosity at the reference pressure;
$Z_{ref}$ is the compressibility factor of the fluid at the reference pressure;
$\overline{P}$ is average pressure of a matrix block of the matrix medium;
$\mu$ is viscosity of the fluid at the pressure $\overline{P}$;
$Z$ is a compressibility factor of the fluid at the pressure $\overline{P}$;
$m_f$ is the pseudo-pressure at the final state;
$m_i$ is pseudo-pressure at an initial state of the reservoir;
$P_f$ is pressure of the reservoir at the final state; and
$m(\overline{P})$ is an average pseudo-pressure of the matrix block defined as:

$$m(\overline{P}) = \frac{\mu_{ref} Z_{ref}}{P_{ref}} \int_{P_{ref}}^{\overline{P}} \frac{\overline{P}}{\mu Z} d\overline{P}.$$

According to one feature of the invention, previously in step a) a plurality of values of corrective factors are determined and stored, and in step b), the corrective factor is determined from the stored values.

Preferably, the exchange flow fp is calculated use of a relationship of the type:
fp=CPmpΔϕp, with C being a geometric coefficient defined by C=ΔA·ΔB·ΔC·Iv (X), with ΔA, ΔB, ΔC being the dimensions of the mesh, IV (X) a shape factor, Δϕp being the potential difference and Pmp being a property relating to the fluids and to the matrix medium.

In addition, the invention relates to a computer program product downloadable from a communication network and/or recorded non transiently on a computer readable medium and/or executable by a processor, including program code instructions for the implementation of the method according to one of the previous features, when the program is executed on a computer.

BRIEF DESCRIPTION OF THE INVENTION

Other features and advantages of the method according to the invention will appear on reading the description below and non-restrictive examples of embodiments, referring to the accompanying Figures and described below.

FIG. 1 illustrates a horizontal projection of a block for a first example.

For this first example, FIG. 2 illustrates curves of gas production P as a function of time T, according to a reference (that is according to the reference model finely meshing the block), according to two methods according to the prior art, and according to the method according to the invention.

DETAILED DESCRIPTION OF THE INVENTION

Figure 1:
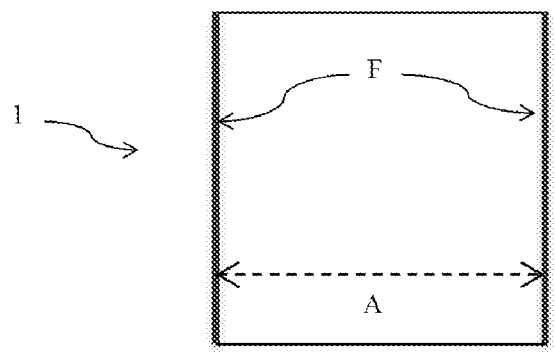

The method according to the invention can be used to optimize the development of a hydrocarbon deposit, notably when the latter comprises a fracture network. A geological model is constructed on the basis of seismic data, well data, and sedimentary and lithological data, that is a meshed representation, of the deposit being studied, having a detailed representation of its actual internal complexity. This model comprises a set of meshes with each of the meshes of this representation comprising one or more values of properties relating to the deposit being studied. In addition, each mesh contains an image of the fracture network. This model forms a complex porous medium, composed of a set of porous matrix blocks, of irregular shapes and sizes. Each of the blocks is defined by fractures.

Given its geometric complexity, such a model, although representative, cannot be used to make production forecasts for the deposit. It is essential to simplify it in an "equivalent" model. An "equivalent medium" is the term used for a medium whereof the estimate for recovering oil in a displacement process, such as capillary imbibition, is substantially the same as the estimate for recovering oil performed on the porous complex medium, that is representative of the various shapes and dimensions of the matrix blocks constituting the deposit being considered.

Thus, a simplified "equivalent" model (simplification by equivalence to a Warren & Root model) is constructed on the basis of this geological model, according to the prior art, having blocks of identical dimensions and shapes which have the same petrophysical properties and behave in an equivalent manner in terms of oil recovery. For example, the criterion of equivalence is based on oil recovery in the process of capillary imbibition of the blocks involved in an injection of water (according to patent application FR 2.757.957 corresponding to U.S. Pat. No. 6,064,944).

According to the invention, this same simplified model is used to reliably and accurately simulate the production of both compressible and incompressible fluids, originating from the blocks over time. Then, flow simulations are performed, which can be used to calculate more representative, more reliable, more accurate, and more numerous production forecasts. The method according to the invention can be used to take less risky development decisions more quickly.

The present invention requires having:
measurements of properties relating to the formation being studied. These measurements may be measurements of petrophysical properties performed in situ, at different points of the formation being studied, such as porosity, permeability and lithology (that is the type of rock), relative permeability or capillary pressure. These measurements may have been obtained, for example, by coring, via logs carried out in wells, by seismic acquisition surveys. But it may also involve measurements (oil flow rates, water flow rates, pressure variations, for example) related to flows in the layer being studied, which are obtained, for example, by the fluid being placed in production in some wells traversing the formation, during well tests or interference tests. These properties may notably be used to construct a meshed representation of the formation being studied. In order to best characterize the fracture network present in the formation, measurements may also be necessary for concerning the strike, dip or extent of the fractures present in the formation being studied, since this information is determined, for example, on the basis of logging measurements or on outcrops.

A meshed representation representative of the formation being studied. This is also termed a "reservoir model" which is a kind of scale model of the subsoil constructed for the purpose of describing as precisely as possible the structure, the petrophysical properties of the formation being studied, or the properties of the fluids present in the formation. This scale model is generally represented on a computer, and has meshing or a grid. Each of the meshes of this grid comprising one or more values of properties relating to the formation being studied (porosity, permeability, saturation, etc.). A reservoir model has to verify as far as possible the properties relating to the formation studied collected in the ground which are the logging data measured along the wells, the measurements performed on rock samples taken in the wells, the data deduced from seismic acquisition surveys, production data such as oil and water flow rates, pressure variations, etc. Those individually working in reservoir simulation are fully cognizant of methods for constructing such a meshed representation of a formation. It should be noted that the reservoir model may be merged with the geological model when the computing power is sufficient to allow numerical calculations of flow simulation on a fine-mesh grid. In other instances, the analyst may have recourse to a technique of "upscaling" in order to pass from a fine-mesh model (the geological model) to a coarser mesh model (the reservoir model). This upscaling step may be performed, for example, with the help of CobraFlow software (IFP Energies nouvelles, France).

A flow simulator. A flow simulator is a numerical program, executed on a computer, which is used to predict the flow of fluids within a formation. Flow simulation, also termed reservoir simulation, numerically predicts the production of a fluid trapped in one or more layers of an underground formation, the production requiring the existence of at least one injector well (in which another fluid is injected, which will drive out the trapped fluid) and a producer well (toward which the trapped, driven fluid will be displaced and from which it will be able to be extracted). Advantageously, a "dual medium" flow simulator will be employed, which can be used to model the exchanges between the blocks of non-fractured rocks (matrix blocks) and the fracture network, without requiring the discretization of these blocks.

An example of such a simulator is the PUMAFLOW software (IFP Energies nouvelles, France).

The method according to the invention comprises four steps:

1—Discretization of the deposit into a set of meshes
2—Modeling the fracture network
3—Simulation of fluid flows
4—Optimization of the production conditions of the deposit 1—Discretization of the Deposit into a Set of Meshes In this step, the deposit is discretized into a set of meshes, for the purpose of having a representation of the deposit.

For some time the petroleum industry has combined field (in situ) measurements with experimental modeling (performed in the laboratory) and/or numerical modeling (by use of software).

Petroleum deposit modeling thus constitutes a technical step essential to any deposit exploration or development. The purpose of this modeling is to provide a description of the deposit, characterized by the structure/geometry and petrophysical properties of the deposits or geological formations of which it is composed.

This modeling is based on a representation of the deposit in a set of meshes. Each of these meshes represents a given volume of the deposit, and constitutes an elementary volume of the deposit. The set of meshes constitutes a meshed (or discrete) representation of the deposit, termed a geological model.

2—Modeling the Fracture Network

In this step, the fracture network of the deposit is modeled, for the purpose of having a representation of the deposit traversed by the fractures.

In order to take into account the role of the fracture network in simulating flows within the deposit, it is necessary to associate a fracture modeling with each of these elementary volumes (the meshes).

Thus, according to the invention, the starting point is a geological model of the deposit being studied, that is a more or less detailed representation of the fracture network, that is as faithful as possible, from direct and indirect observations of the reservoir made by those who are responsible for the characterization of the reservoir. This model is a complex porous medium, composed of a set of porous matrix blocks, of irregular shapes and sizes, defined by fractures. This complex porous medium constitutes an image representative of the actual fracture network delimiting the matrix blocks.

For implementing such a method, modeling software may be used, which is well known, such as FRACAFlow® software (IFP Energies nouvelles, France).

Due to its extreme geometric complexity, the preceding geological model, representative of the actual fractured reservoir, may not be used directly for simulating, that is reproducing and/or predicting, the production of the deposit during the implementation of a recovery method, such as water injection, for example.

In order to overcome this obstacle, this model of the actual complex porous medium is simplified. A "dual medium" approach, also called a "dual porosity approach", is applied, proposed, for example, by Warren J. E. et al. (Ref.: "The Behavior of Naturally Fractured Reservoirs", SPE Journal (September 1963), 245-255). The "dual porosity" approach considers the fractured medium as two continua of contrasting properties exchanging fluids between one another. The "fracture" (or "fissure") continuum is the fracture network and the "matrix" continuum is the matrix blocks with the combination of the two continua constituting a "dual medium". Reservoir simulators based on this approach are termed "dual porosity" or "dual medium" simulators.

The implementation of a "dual medium" simulator uses the calculation of the exchanges between each of the two fracture and matrix meshes representing the "dual medium" in any volume element (or mesh) of the reservoir. Classically, this calculation is based on the equivalent (Warren & Root type) simplified representation, according to which the distribution of geological blocks is represented by a set of identical and parallelepiped shaped "equivalent" blocks, of dimensions ($L_x$, $L_y$, $L_z$). Obtaining this simplified representation forms the subject matter of patent application FR 2.757.957 corresponding to U.S. Pat. No. 6,064,944. The method according to the invention also starts from this simplified representation commonly used by fractured reservoir simulators.

3—Simulation of Fluid Flows

Principle

At this stage, a geological representation exists of the fractured hydrocarbon deposit, from which the hydrocarbons are to be extracted.

A tool well known is then used which is the dual medium reservoir simulator. Each of the two grids (sets of meshes) of this reservoir simulator are filled with input data E(t) which may relate to both the properties (for example lithological facies, matrix and fissure permeabilities ($K_m$, $K_f$), matrix and fissure porosities ($\Phi_m$, $\Phi_f$), etc.) associated with each of the two "matrix" (for the "matrix" grid) and "fracture" (for the "fissure" grid) media, and properties associated with the fluids contained by these two media (for example densities, viscosities, etc.). For this representation, the exchanges within the fracture medium, the exchanges within the matrix medium, and the exchanges between the matrix medium and the fracture medium are considered for a given pair of meshes.

By use of this information, the simulator can determine, in each mesh, and for each time increment t, various parameters S(t), such as the phase saturation ($S_m$, $S_f$) (for example water or oil) in each of the two matrix and fissure media, the corresponding fluid pressure ($P_m$, $P_f$) in each of the two media, optionally the concentration, temperature, etc., according to the nature of the recovery method (gas, water injection, etc.). To do this, the simulator solves two sets of coupled equations which a first set relates to the matrix medium and a second set relates to the fractured medium. These two sets of equations are coupled, via a flow term, expressing the mass and/or energy transfers (termed "matrix-fissure exchanges") between the porous rock (matrix blocks) and the fractures that traverse it. This matrix-fracture exchange flow (f) depends on the potential difference ($\Delta\Phi$) between these two media with the latter being expressed as a difference in pressure, temperature, etc., according to the nature of the physical process of exchange involved in the recovery method applied.

According to one embodiment of the method according to the invention, the proportionality factor C, called an exchange factor, may be calculated according to a known solution of the exchange flow in a pseudo-permanent regime and which indicates that:

$$C = \frac{\pi^2}{L_x^2} + \frac{\pi^2}{L_y^2} + \frac{\pi^2}{L_z^2}$$

(in the general case taking place in the 3 directions x, y, z)

With $L_x$, $L_y$, $L_z$ being the dimensions along the exchange directions x, y and z.

In order to increase the reliability and accuracy of the flow simulations of various fluids (liquid or gaseous), the method of the invention takes into account a corrective factor for the exchange flows which corrects the significant errors on these flows associated with the compressibility of the fluid and the low permeability of the matrix.

Determination of an Exchange Flow Corrective Factor

In this operation, an exchange flow corrective factor is determined. This operation may be performed before, simultaneously with or after the operation for determining the exchange flow, given that these two values are determined independently. The purpose of the corrective factor is to correct the exchange flow in order to obtain a more accurate simulation.

According to the invention, the exchange flow corrective factor is dependent on the initial pressure of the deposit and the minimum production pressure imposed on the producer wells.

Thus, the corrective factor can be used to take into account the flows of compressible fluids, such as gases, during simulation. In addition, the corrective factor can be used to take into account the permeability of the matrix medium.

According to one embodiment of the invention, the exchange flow corrective factor is obtained by use of a pseudo-pressure formulation of the flow equations for the fluids in the deposit. This pseudo-pressure formulation is classically used for interpreting gas (compressible fluids) well tests, which requires a particular treatment transforms pressure data/measurements into pseudo-pressure according to a transformation intended to integrate the appreciable variations in the properties of the fluid as a function of pressure (an example of such a pseudo-pressure formulation is described notably in the work by Hagoort, J. (1988) Fundamentals of Gas Reservoir Engineering, Developments in Petroleum Science, 23, Elsevier).

In accordance with one embodiment of the invention, an exchange flow corrective factor may be calculated for the transient or "short-time" regime, and another corrective factor may be calculated for the pseudo-permanent or "long-time" regime. The transient regime corresponds to the initial phases of invasion of the mesh by the fluid. The pseudo-permanent regime begins when the exchange flow becomes proportional to the potential difference (for example the difference in pressures or pseudo-pressures, the temperature difference, etc.) between the two matrix and fissure media, with a proportionality factor independent of time. The method according to the invention then applies the corrective factor according to the regime of the fluid flow.

According to a variant embodiment of the invention, the exchange flow corrective factor, varying according to the pressure described during the development of the reservoir being considered, may be determined by means of the following steps:

deriving the corrective factor in question from a pseudo-pressure formulation of the flow equations (as used by the profession for interpreting gas well tests): which is thus written as a function of the current pseudo-pressure and pressure. However, because of the known correspondence between the variables of pseudo-pressure and pressure for the fluid being considered (knowing the evolution in viscosity and compressibility of this fluid as a function of pressure), this factor may finally be calculated as a simple function of pressure.

accounting for the sequence in time of a transient ("short-time", but which in reality may be long in the case of fields with a matrix of very low permeability) exchange regime, and a long-time "pseudo-permanent" regime. Accordingly, the value of the corrective factor is the result of distinct formulae according to whether it is situated in one or other of the two regimes.

the transitioning between the two regimes (therefore between the two calculation methods) which takes place for a value of the pseudo-pressure equal to the $$\frac{m_f + m_i}{2}$$

average value of the interval of the pseudo-pressure values described during development ($m_i$ and $m_f$) being the pseudo-pressure values corresponding to the initial pressure of the reservoir on the one hand and to the final pressure imposed via the wells in the fractures on the other).

Formulating the corrective factor for unidirectional or pluridirectional exchanges, which account for the knowledge of the exact flows at the initial times and the long-time "pseudo-permanent" flows.

According to one implementation of the invention, the values of this exchange flow corrective function as a function of pressure may be determined beforehand then stored in a memory (notably a computer memory), for example in array form. These values may then be read as input data (for example in simple array form giving the pressure in a first column, and the pre-calculated value of the corrective flow coefficient in a second column).

According to a variant embodiment, the corrective factor for the transient exchange regime with one dimension (1D) $\beta_{m-1D}^{ST}(\overline{P})$ may be written by a formula of the type:

$$\beta_{m-1D}^{ST}(\overline{P}) = \frac{\frac{P_{ref}}{\mu_{ref} Z_{ref}}}{\frac{\overline{P}}{\mu Z}} \frac{8}{\pi^3} \frac{(m_f - m_i)^2}{[P_f - \overline{P}][m(\overline{P}) - m_i]}$$

with $P_{ref}$ being a reference pressure $\mu_{ref}$ being viscosity at the reference pressure;

$Z_{ref}$ being a compressibility factor of the fluid at the reference pressure;

$\overline{P}$ being an average pressure of the matrix block;

$\mu$ being viscosity of the fluid at the pressure $\overline{P}$;

$Z$ being a compressibility factor of the fluid at the pressure $\overline{P}$;

$m_f$ being pseudo-pressure at a final state (state when the pressure of the reservoir is equal to the minimum pressure imposed at the well bottom);

$m_i$ being the pseudo-pressure at an initial state of the reservoir;

$P_f$ being pressure of the reservoir at the final state (equal to the minimum pressure imposed in the fractures via the production wells); and $m(\overline{P})$ being average pseudo-pressure of the matrix block defined as:

$$m(\overline{P}) = \frac{\mu_{ref} Z_{ref}}{P_{ref}} \int_{P_{ref}}^{\overline{P}} \frac{\overline{P}}{\mu Z} d\overline{P}.$$

According to a variant embodiment, the corrective factor for the transient exchange regimes of two dimensions (that is along 2 directions x and y of the parallelepiped block of the matrix medium), $\beta_{m-2D}^{ST}(\overline{P}) = SC \cdot \beta_{m-1D}^{ST}(\overline{P})$ may be written by a formula: $\beta_{m-2D}^{ST}(\overline{P}) = SC \cdot \beta_{m-1D}^{ST}(\overline{P})$ with $$\beta_{m-1D}^{ST}(\overline{P}) = \frac{\frac{P_{ref}}{\mu_{ref} Z_{ref}}}{\frac{\overline{P}}{\mu Z}} \frac{8}{\pi^3} \frac{(m_f - m_i)^2}{[P_f - \overline{P}][m(\overline{P}) - m_i]} \text{ and}$$

$$SC = 1 + \left(\frac{\frac{1}{L_{eq}^{0\,2}}}{\frac{1}{L_{eq}^{LT\,2}}} - 1\right)\left[\frac{m - \frac{m_f + m_i}{2}}{m_i - \frac{m_f + m_i}{2}}\right]$$

with the previous definitions as well as those that follow:

$m = m(\overline{P})$ being an average pseudo-pressure of the matrix block, $L_{eq}^{\circ}$ being equivalent dimension of the matrix block at a beginning of the transient regime (when $m = m_i$), which is equal to the equivalent length of the block for a 1D exchange or:

$$L_{eq}^0 = \frac{L_x L_y}{L_x + L_y},$$

for a block whereof the dimensions directions x and y are equal to $L_x$ and $L_y$; and $L_{eq}^{LT}$ being the equivalent length of the matrix block at the end of the transient regime and during the pseudo-permanent regime defined as follows:

$$L_{eq}^{LT} = \frac{1}{\sqrt{\frac{1}{L_x^2} + \frac{1}{L_y^2}}}.$$

According to a variant embodiment, the corrective factor for the pseudo-permanent regimes in one dimension $\beta_{m-1D}^{LT}(\overline{P})$ or in two dimensions $\beta_{m-2D}^{LT}(\overline{P})$ is written by a formula of the type:

$$\beta_{m-1D}^{LT}(\overline{P}) = \beta_{m-2D}^{LT}(\overline{P}) = \frac{\frac{P_{ref}}{\mu_{ref} Z_{ref}}}{\frac{\overline{P}}{\mu Z}} \frac{[m_f - m(\overline{P})]}{[P_f - \overline{P}]}$$

with the notations used previously, notably taking into account $L_{eq}^{LT}$.

It is to be noted that the method according to the invention also applies to fluids of low compressibility but with corrective factors that may be determined more simply as a function of just pressure (and not pseudo-pressures).

Simulation of Flows

In this step, the flows of fluid(s) in the deposit are simulated, by use of the dual medium model, exchange flows and determined corrective factors. A production method may be chosen, that is the recovery method by water injection, for which the optimum implementation scenario then remains to be specified for the field being considered. The definition of an optimum water injection scenario may, for example, set the number and location (position and spacing) of the injector and producer wells in order to best account for the impact of the fractures on the progress of the fluids within the reservoir.

According to the chosen scenario using the dual medium representation of the deposit, the formula links the mass and/or energy exchange flow to the matrix-fracture potential difference, and the exchange flow corrective factor. It is then possible to simulate the expected hydrocarbon production, by use of the "dual medium" flow simulator. The simulator then makes use of this corrective factor to calculate a precise value of the exchange flow at each time increment of the simulation characterized by a given pressure value.

At any instant t of the simulated production, on the basis of the input data E(t) (fixed or simulated time variable data), the formula linking the exchange flow (t) to the potential difference ($\Delta\Phi$), and the exchange flow corrective factor, the simulator solves the set of equations specific to each mesh and each of the two grids of the model (equations involving the matrix-fissure exchange formula described earlier) and thus supplies the solution values of the unknowns S(t) (saturations, pressures, concentrations, temperature, etc.) at this instant t. This solution provides knowledge of the quantities of oil produced and the state of the deposit (distribution of pressures, saturations, etc.) at the instant considered. However, the exchange flow as calculated at present on the assumption of a pseudo-permanent exchange regime and low compressibility fluids must be multiplied by the corrective factor $\beta_{m-2D}^{ST}(\overline{P})$ or $\beta_{m-2D}^{ST}(\overline{P})$ during the transient exchange period (1D or 2D, respectively), then by the corrective factor $\beta_{m-1D}^{LT}(\overline{P})=\beta_{m-2D}^{LT}(\overline{P})$ during the pseudo-permanent transient exchange period starting when the pseudo-pressure is equal to $$\frac{m_f + m_i}{2}.$$

For a matrix-fissure exchange governed by pressure, the current expression of the pseudo-permanent exchange mass flow is:

$$Q_{fm}^{LT}(\overline{P}) = \rho \frac{\pi^2}{L^2} \frac{k_m}{\mu} [P_f - \overline{P}]$$

where $\rho$ is the density of the fluid, $\mu$ is the viscosity of the fluid, $k_m$ is the permeability of the matrix medium. L is the length of exchange equal to the dimension of the block along the direction of exchange for a 1D exchange, or to the equivalent length $L_{eq}$ such that:

$$\frac{1}{L_{eq}^2} = SC \frac{1}{L_{eq}^{LT^2}}$$

where SC is as defined earlier) for an exchange along two directions of the parallelepiped block.

4—Optimization of the Production Conditions of the Deposit (EXP)

On the basis of the simulations performed in the preceding steps, s several development plans may be determined corresponding to various possible configurations for developing the underground reservoir such as location of the producer and/or injector wells, target values for the flow rates per well and/or for the reservoir, the type of tools used, the fluids used, injected and/or recovered, etc. Production forecasts should be determined for each of these plans. These probabilistic production forecasts are obtained by use of flow simulation software as well as by means of a fractured reservoir numerical model. A reservoir simulation is a technique that can be used to simulate the fluid flows within a reservoir by use of a software program called a flow simulator, and the reservoir model. For example, the Puma-Flow® software program (IFP Energies nouvelles, France) is a flow simulator.

One or more possible development plans are defined which are suited to the fractured reservoir model (also called a geological model). The responses are determined by simulation for each of these plans.

On the basis of the probabilistic production forecasts defined for each development plan, the development plan may be chosen by comparison which seems to them to be the most relevant. For example:
  by comparing the maximum volume of recovered oil, the production plan likely to provide the maximum recovery or to be the most profitable.
  by comparing the standard deviation of the volume of recovered oil, the least risky production plan may be determined.

Then the reservoir is developed according to the development plan defined for example by drilling new wells (producer or injector), by modifying the tools used, by modifying the flow rates and/or the nature of fluids injected, etc.

The method according to the invention is particularly suitable for the production of compressible fluids (gas) in reservoirs of very low permeability. Indeed, it can be used to take into account the compressibility of fluids and the permeability of the reservoir. However, the method according to the invention may be used for any type of fluid and any type of reservoir.

The invention further relates to a computer program product downloadable from a communication network and/or recorded on a non transient computer readable medium and/or executable by a processor. This program includes program code instructions for the implementation of the method as described above, when the program is executed on a computer.

In a general way, the invention can be used to predict the hydrodynamic behavior (flow rate, pressure, etc.) of fractured fields (or considered and modeled as such) in response to external stresses imposed via wells during the production of hydrocarbons.

Those who are responsible for the development of the deposit then have a tool allowing them to quickly and accurately evaluate the performance of various production scenarios, and thus, to select the one plan that optimizes the development in light of the criteria selected by the operator, for example to ensure optimum hydrocarbon production in terms of flow rate and recovery.

Thus, the invention has an industrial application in the development of any type of underground deposit traversed by a fracture network. It may, for example, be a hydrocarbon deposit for which production is to be optimized, or a gas storage deposit, for example, for which the injection or the storage conditions are to be optimized.

APPLICATION EXAMPLES

Two examples are described to illustrate the advantages of the present invention.

Example 1: Production at the Scale of a Matrix Block

It is sought to predict the production from a parallelepiped matrix block via two of its opposite faces. FIG. 1 depicts a horizontal projection of the parallelepiped block 1. The block is bounded by two fractures F, via which the production of the block is required. The block is initially assumed to be saturated with gas and interstitial water (stationary), at a pressure of 3 800 psi (262 bar). A pressure of 1 000 psi (70 bar) is imposed and maintained constant in the two fractures from this initial instant. The other boundaries of the block are assumed to be impermeable. In the simulated example, the two very thin fractures (0.01 foot or approximately 3 mm opening) are spaced apart by a length A of 200 feet (or approximately 61 m) and the matrix has a permeability of 100 nanodarcy (0.0001 mD).

For this example, the reference production REF is determined, that is the exact solution calculated by use of a model very finely discretizing the matrix block and the two fractures bounding it. In addition, the production is evaluated by applying to this example various dual medium models, which only comprise a single dual medium mesh, that is a fissure mesh and a matrix mesh. The first model according to the prior art AA1, with a constant shape factor corresponds to the forecast of the production of a conventional dual medium reservoir simulator, which does not take account of short-time transient exchanges, nor of the effects of the compressibility of the fluid on the calculation of the exchanges between the matrix and fracture meshes of a dual medium model. The second model according to the prior art AA2, with a variable shape factor, corresponds to the forecast of the production with correction of the short-time flows but according to a formalism in pressure, that is without taking into account the errors in exchange flows associated with the considerable modification of gas properties as a function of pressure. The third model according to the invention INV, corresponds to the determination of the exchange flow with a correction of this flow based on a formalism of the exchanges in pseudo-pressure.

Figure 2:
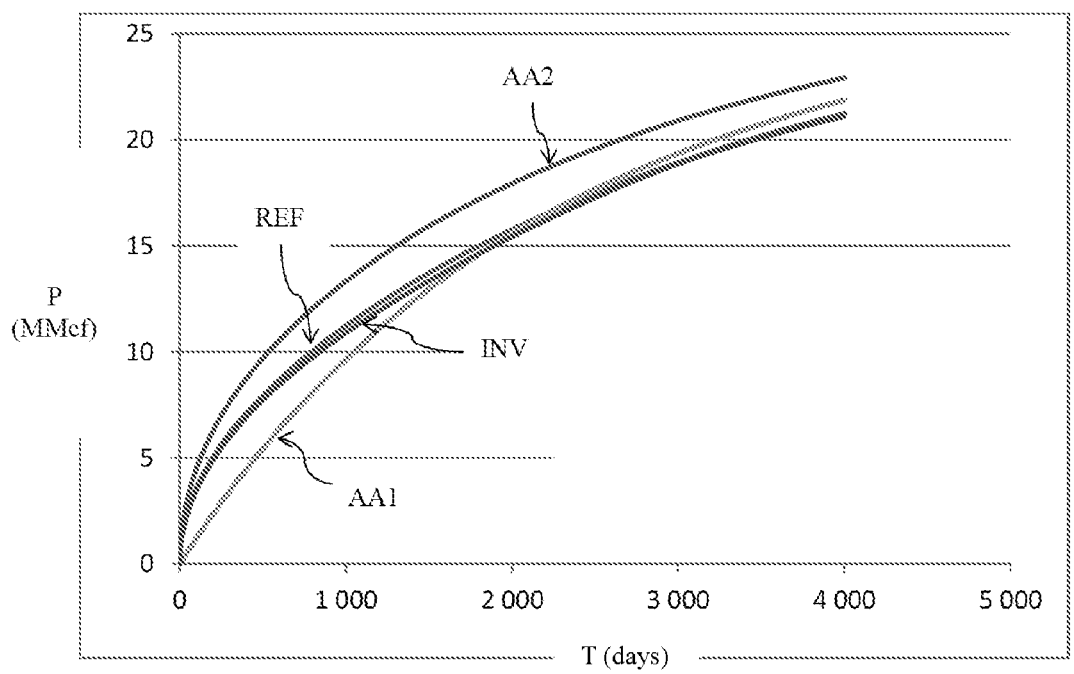

FIG. 2 illustrates gas production P in MMcf (million cubic feet, a cubic foot substantially equal to 28.3 liters) as a function of time T in days, for the reference production REF, for evaluations with the models according to the prior art AA1 and AA2, and according to the invention INV. Note that the model according to the prior art AA1 does not reproduce the reference production curve, since it underestimates the production at short times, and overestimates it at long times. In addition, the model according to the prior art AA2 is not satisfactory since it overestimates the production. On the other hand, the model according to the invention INV gives a production forecast that is very close to the reference solution REF, whatever the instant of production considered.

Example 2: Production at the Scale of a Reservoir Volume

Figure 3:
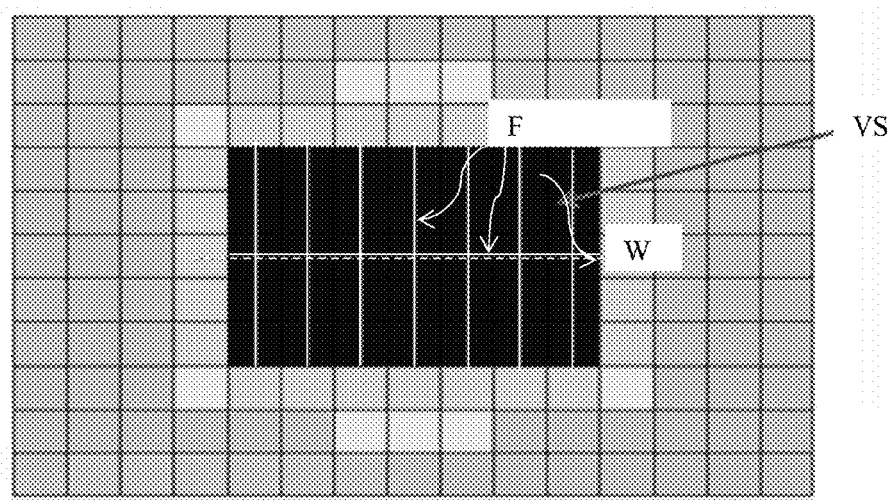
FIG. 3 illustrates a horizontal projection of a gas reservoir for a second example.

In the same way, it is sought to predict the production from a portion of reservoir. FIG. 3 illustrates the portion of reservoir placed in production by use of a horizontal well W which intersects a network of bidirectional fractures F having two families of orthogonal vertical fractures, generated by stimulation of the well. These fractures F are assumed to define matrix blocks of 100 feet by 100 feet (approximately 30.5 m) along directions X and Y, in the stimulated zone VS surrounding the well. This time the matrix-fracture exchanges are bidirectional, that is they take place along directions X and Y. Beyond the stimulated zone VS (1 400 feet×1 000 feet×300 feet, or approximately 427 m×305 m×91.5 m), the reservoir is not fractured and behaves as a single medium possessing the properties of the matrix identical to those of the preceding case.

For this example, the reference production REF is determined, that is the exact solution calculated by a model very finely discretizing each of the matrix blocks and each of the fractures F of the stimulated zone VS around the well. In addition, the production is evaluated by applying to this example various dual medium models, which comprise meshes of 200 feet×200 feet×300 feet (approximately 61 m×61 m×91.5 m). The first model according to the prior art AA1, with a constant shape factor corresponds to the forecast of the production of a conventional dual medium reservoir simulator, which does not take account of short-time transient exchanges, nor of the effects of the compressibility of the fluid on the calculation of the exchanges between the matrix and fracture meshes of a dual medium model. The second model according to the invention INV, corresponds to the determination of the exchange flow and an exchange flow corrective term. The exchange flow corrective term depends on the initial and minimum pressures of the deposit.

Figure 4:
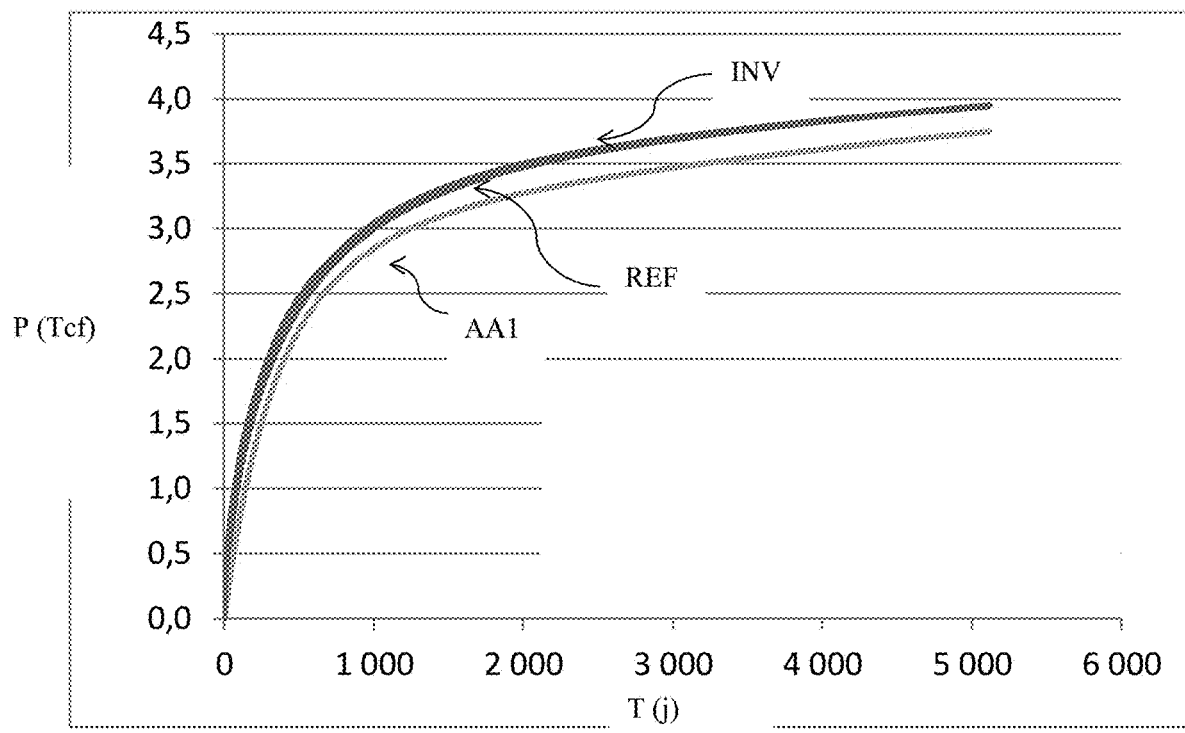
FIG. 4 illustrates curves of gas production P as a function of time T for the second example, as a reference, for a method according to the prior art, and for the method according to the invention.

FIG. 4 illustrates gas production P in Tcf (1012 cubic feet) as a function of time T in days, for the reference production REF, for evaluations with the models according to the prior art AA1, and according to the invention INV. Note that the model according to the prior art AA1 does not reproduce the reference production curve, since it underestimates the production at short times. On the other hand, the model according to the invention INV faithfully reproduces the forecasts of the reference model REF.

The invention claimed is:

1. A method for development of a fluid deposit traversed by a fracture network, based on measurements of properties relating to the fluid deposit and a meshed representation of the fluid deposit which is constructed with each mesh of the representation comprising a matrix medium and a fractured medium, and in which an initial pressure of the fluid deposit and a minimum production pressure of the fluid deposit are known, comprising:
   a) determining for each mesh an exchange flow that takes place between the matrix medium and the fractured medium;
   b) determining exchange flow corrective factors respectively calculated for longer term pseudo-permanent exchange regimes and shorter term transient exchange regimes for correcting the exchange flow by use of the initial pressure of the fluid deposit and the minimum production pressure of the fluid deposit with the exchange flow corrective factors of the exchange flow being obtained by a formulation of pseudo-pressure by formulation of flow equations of the fluid deposit which are determined for the longer term pseudo-permanent exchange regimes and shorter term transient exchange regimes;
   c) simulating flows of the fluid in the fluid deposit with a flow simulator, using the exchange flow and the corrective factors and wherein the exchange flow used for the simulation of the flows is multiplied by the exchange flow corrective factors; and
   d) optimizing the development of the fluid deposit by use of the simulation of the flows in the fluid deposit with the flow simulator; and wherein
   the longer term pseudo-permanent exchange regimes and shorter term transient exchange regimes are determined from an initial pressure of the fluid deposit and a final pressure of wells drilled during the development of the fluid deposit and transitioning between the longer term pseudo-permanent exchange regimes and shorter term transient exchange regimes which utilizes calculation of an average value of the longer term pseudo-permanent exchange regimes and shorter term transient exchange regimes.

2. The method as claimed in claim 1, wherein the steps a) and b) are performed in order.

3. The method as claimed in claim 1, wherein the corrective factor of the exchange flow is obtained by a formulation of the pseudo-pressure by flow equations of the fluid deposit.

4. The method as claimed in claim 2, wherein the corrective factor of the exchange flow is obtained by a formulation of the pseudo-pressure by flow equations of the fluid deposit.

5. The method as claimed in claim 1, wherein the corrective factor for shorter term transient exchange regimes in one dimension $\beta_{m-1D}^{ST}(\overline{P})$ is written as follows:

$$\beta_{m-1D}^{ST}(\overline{P}) = \frac{\frac{P_{ref}}{\mu_{ref} Z_{ref}}}{\frac{\overline{P}}{\mu Z}} \frac{8}{\pi^3} \frac{(m_f - m_i)^2}{[P_f - \overline{P}][m(\overline{P}) - m_i]}$$

with
wherein $P_{ref}$ is reference pressure;
$\mu_{ref}$ is viscosity at the reference pressure;
$Z_{ref}$ is compressibility factor of the fluid at the reference pressure;
$\overline{P}$ is an average pressure of a matrix block of the matrix medium;
$\mu$ is viscosity of the fluid at a pressure $\overline{P}$;
$Z$ is compressibility factor of the fluid at the pressure $\overline{P}$;
$m_f$ is pseudo-pressure at a final state;
$m_i$ is pseudo-pressure at an initial state of the reservoir;
$P_f$ is pressure of the reservoir at a final state; and
$m(\overline{P})$ is an average pseudo-pressure of the matrix block defined by a relationship:

$$m(\overline{P}) = \frac{\mu_{ref} Z_{ref}}{P_{ref}} \int_{P_{ref}}^{\overline{P}} \frac{\overline{P}}{\mu Z} d\overline{P}.$$

6. The method as claimed in claim 2, wherein the corrective factor for shorter term transient exchange regimes in one dimension $\beta_{m-1D}^{ST}(\overline{P})$ is written as follows:

$$\beta_{m-1D}^{ST}(\overline{P}) = \frac{\frac{P_{ref}}{\mu_{ref} Z_{ref}}}{\frac{\overline{P}}{\mu Z}} \frac{8}{\pi^3} \frac{(m_f - m_i)^2}{[P_f - \overline{P}][m(\overline{P}) - m_i]}$$

with
wherein $P_{ref}$ is reference pressure;
$\mu_{ref}$ is viscosity at the reference pressure;
$Z_{ref}$ is compressibility factor of the fluid at the reference pressure;
$\overline{P}$ is an average pressure of a matrix block of the matrix medium;
$\mu$ is viscosity of the fluid at a pressure $\overline{P}$;
$Z$ is compressibility factor of the fluid at the pressure $\overline{P}$;
$m_f$ is pseudo-pressure at a final state;
$m_i$ is pseudo-pressure at an initial state of the reservoir;
$P_f$ is pressure of the reservoir at a final state; and
$m(\overline{P})$ is an average pseudo-pressure of the matrix block defined by a relationship:

$$m(\overline{P}) = \frac{\mu_{ref} Z_{ref}}{P_{ref}} \int_{P_{ref}}^{\overline{P}} \frac{\overline{P}}{\mu Z} d\overline{P}.$$

7. The method as claimed in claim 4, wherein the corrective factor for shorter term transient exchange regimes in one dimension $\beta_{m-1D}^{ST}(\overline{P})$ is written as follows:

$$\beta_{m-1D}^{ST}(\overline{P}) = \frac{P_{ref}/\mu_{ref} Z_{ref}}{\overline{P}/\mu Z} \frac{8}{\pi^3} \frac{(m_f - m_i)^2}{[P_f - \overline{P}][m(\overline{P}) - m_i]}$$

with
wherein $P_{ref}$ is reference pressure;
$\mu_{ref}$ is viscosity at the reference pressure;
$Z_{ref}$ is compressibility factor of the fluid at the reference pressure;
$\overline{P}$ is an average pressure of a matrix block of the matrix medium;
$\mu$ is viscosity of the fluid at a pressure $\overline{P}$;
$Z$ is compressibility factor of the fluid at the pressure $\overline{P}$;
$m_f$ is pseudo-pressure at a final state;
$m_i$ is pseudo-pressure at an initial state of the reservoir;
$P_f$ is pressure of the reservoir at a final state; and
$m(\overline{P})$ is an average pseudo-pressure of the matrix block defined by a relationship:

$$m(\overline{P}) = \frac{\mu_{ref} Z_{ref}}{P_{ref}} \int_{P_{ref}}^{\overline{P}} \frac{\overline{P}}{\mu Z} d\overline{P}.$$

8. The method as claimed in claim 4, wherein the corrective factor for shorter term transient exchange regimes in one dimension is written as follows:

$$\beta_{m-1D}^{ST}(\overline{P}) = \frac{P_{ref}/\mu_{ref} Z_{ref}}{\overline{P}/\mu Z} \frac{8}{\pi^3} \frac{(m_f - m_i)^2}{[P_f - \overline{P}][m(\overline{P}) - m_i]}$$

with
wherein $P_{ref}$ is reference pressure;
$\mu_{ref}$ is viscosity at the reference pressure;
$Z_{ref}$ is compressibility factor of the fluid at the reference pressure;
$\overline{P}$ is an average pressure of a matrix block of the matrix medium;
$\mu$ is viscosity of the fluid at a pressure $\overline{P}$;
$Z$ is compressibility factor of the fluid at the pressure $\overline{P}$;
$m_f$ is pseudo-pressure at a final state;
$m_i$ is pseudo-pressure at an initial state of the reservoir;
$P_f$ is pressure of the reservoir at a final state; and
$m(\overline{P})$ is an average pseudo-pressure of the matrix block defined by a relationship:

$$m(\overline{P}) = \frac{\mu_{ref} Z_{ref}}{P_{ref}} \int_{P_{ref}}^{\overline{P}} \frac{\overline{P}}{\mu Z} d\overline{P}.$$

9. The method as claimed in claim 1, in which the corrective factor for shorter term transient exchange regimes in two dimensions $\beta_{m-2D}{}^{ST}(\overline{P})$ is written as follows:
$\beta_{m-2D}{}^{ST}(\overline{P}) = SC \cdot \beta_{m-1D}{}^{ST}(\overline{P})$ with $$\beta_{m-1D}^{ST}(\overline{P}) = \frac{P_{ref}/\mu_{ref} Z_{ref}}{\overline{P}/\mu Z} \frac{8}{\pi^3} \frac{(m_f - m_i)^2}{[P_f - \overline{P}][m(\overline{P}) - m_i]}$$

and $$SC = 1 + \left(\frac{\frac{1}{L_{eq}^{0^2}}}{\frac{1}{L_{eq}^{LT^2}}} - 1\right) \left[\frac{m - \frac{m_f + m_i}{2}}{m_i - \frac{m_f + m_i}{2}}\right]$$

with
formula of the type: $\beta_{m-2D}{}^{ST}(\overline{P})$
$P_{ref}$ is a reference pressure;
$\mu_{ref}$ is viscosity at the reference pressure;
$Z_{ref}$ is a compressibility factor of the fluid at the reference pressure;
$\overline{P}$ is an average pressure of a matrix block of the matrix medium;
$\mu$ is viscosity of the fluid at a pressure $\overline{P}$;
Z is a compressibility factor of the fluid at the pressure $\overline{P}$;
$m_f$ is a pseudo-pressure at a final state;
$m_i$ is a pseudo-pressure at an initial state of the reservoir;
$P_f$ is a pressure of the reservoir at the final state;
$m(\overline{P})$ is an average pseudo-pressure of the matrix block defined as:

$$m(\overline{P}) = \frac{\mu_{ref} Z_{ref}}{P_{ref}} \int_{P_{ref}}^{\overline{P}} \frac{\overline{P}}{\mu Z} d\overline{P},$$

wherein
$L_{eq}^{0}$ is an equivalent length of a matrix block of one dimension at the initial time of a transient regime; and
$L_{eq}^{ST}$ is an equivalent length of a matrix block of one dimension at a final time of a transient regime.

10. The method as claimed in claim 2, in which the corrective factor for shorter term transient exchange regimes in two dimensions $\beta_{m-2D}{}^{ST}(\overline{P})$ is written as follows:
$\beta_{m-2D}{}^{ST}(\overline{P}) = SC \cdot \beta_{m-1D}{}^{ST}(\overline{P})$ with $$\beta_{m-1D}^{ST}(\overline{P}) = \frac{P_{ref}/\mu_{ref} Z_{ref}}{\overline{P}/\mu Z} \frac{8}{\pi^3} \frac{(m_f - m_i)^2}{[P_f - \overline{P}][m(\overline{P}) - m_i]}$$

and $$SC = 1 + \left(\frac{\frac{1}{L_{eq}^{0^2}}}{\frac{1}{L_{eq}^{LT^2}}} - 1\right) \left[\frac{m - \frac{m_f + m_i}{2}}{m_i - \frac{m_f + m_i}{2}}\right]$$

with
formula of the type: $\beta_{m-2D}{}^{ST}(\overline{P})$
$P_{ref}$ is a reference pressure,
$\mu_{ref}$ is viscosity at the reference pressure,
$Z_{ref}$ is a compressibility factor of the fluid at the reference pressure,
$\overline{P}$ is an average pressure of a matrix block of the matrix medium,
$\mu$ is viscosity of the fluid at a pressure $\overline{P}$
Z is a compressibility factor of the fluid at the pressure $\overline{P}$,
$m_f$ is a pseudo-pressure at a final state
$m_i$ is a pseudo-pressure at an initial state of the reservoir,
$P_f$ is a pressure of the reservoir at the final state,
$m(\overline{P})$ is an average pseudo-pressure of the matrix block defined as:

$$m(\overline{P}) = \frac{\mu_{ref} Z_{ref}}{P_{ref}} \int_{P_{ref}}^{\overline{P}} \frac{\overline{P}}{\mu Z} d\overline{P},$$

wherein
$L_{eq}^{0}$ is an equivalent length of a matrix block of one dimension at the initial time of a transient regime; and
$L_{eq}^{ST}$ is an equivalent length of a matrix block of one dimension at a final time of a transient regime.

11. The method as claimed in claim 3, in which the corrective factor for shorter term transient exchange regimes in two dimensions $\beta_{m-2D}{}^{ST}(\overline{P})$ is written by as follows:
$\beta_{m-2D}{}^{ST}(\overline{P}) = SC \cdot \beta_{m-1D}{}^{ST}(\overline{P})$ with $$\beta_{m-1D}^{ST}(\overline{P}) = \frac{P_{ref}/\mu_{ref} Z_{ref}}{\overline{P}/\mu Z} \frac{8}{\pi^3} \frac{(m_f - m_i)^2}{[P_f - \overline{P}][m(\overline{P}) - m_i]}$$

and $$SC = 1 + \left(\frac{\frac{1}{L_{eq}^{0^2}}}{\frac{1}{L_{eq}^{LT^2}}} - 1\right) \left[\frac{m - \frac{m_f + m_i}{2}}{m_i - \frac{m_f + m_i}{2}}\right]$$

with
formula of the type: $\beta_{m-2D}{}^{ST}(\overline{P})$
$P_{ref}$ is a reference pressure;
$\mu_{ref}$ is viscosity at the reference pressure;
$Z_{ref}$ is a compressibility factor of the fluid at the reference pressure;
$\overline{P}$ is an average pressure of a matrix block of the matrix medium;
$\mu$ is viscosity of the fluid at a pressure $\overline{P}$;
Z is a compressibility factor of the fluid at the pressure $\overline{P}$;
$m_f$ is a pseudo-pressure at a final state;
$m_i$ is a pseudo-pressure at an initial state of the reservoir;
$P_f$ is a pressure of the reservoir at the final state;
$m(\overline{P})$ is an average pseudo-pressure of the matrix block defined as:

$$m(\overline{P}) = \frac{\mu_{ref} Z_{ref}}{P_{ref}} \int_{P_{ref}}^{\overline{P}} \frac{\overline{P}}{\mu Z} d\overline{P},$$

wherein
$L_{eq}^{0}$ is an equivalent length of a matrix block of one dimension at the initial time of a transient regime; and
$L_{eq}^{ST}$ is an equivalent length of a matrix block of one dimension at a final time of a transient regime.

12. The method as claimed in claim 4, in which the corrective factor for shorter term transient exchange regimes in two dimensions $\beta_{m-2D}{}^{ST}(\overline{P})$ is written as follows:
$\beta_{m-2D}{}^{ST}(\overline{P}) = SC \cdot \beta_{m-1D}{}^{ST}(\overline{P})$ with $$\beta_{m-1D}^{ST}(\overline{P}) = \frac{P_{ref}/\mu_{ref}Z_{ref}}{\overline{P}/\mu Z} \frac{8}{\pi^3} \frac{(m_f - m_i)^2}{[P_f - \overline{P}][m(\overline{P}) - m_i]}$$

and $$SC = 1 + \left(\frac{\frac{1}{L_{eq}^{0^2}} - 1}{\frac{1}{L_{eq}^{LT^2}}}\right)\left[\frac{m - \frac{m_f + m_i}{2}}{m_i - \frac{m_f + m_i}{2}}\right]$$

with formula of the type:

$P_{ref}$ is a reference pressure;

$\mu_{ref}$ is viscosity at the reference pressure;

$Z_{ref}$ is a compressibility factor of the fluid at the reference pressure;

$\overline{P}$ is an average pressure of a matrix block of the matrix medium;

$\mu$ is viscosity of the fluid at a pressure $\overline{P}$;

$Z$ is a compressibility factor of the fluid at the pressure $\overline{P}$;

$m_f$ is a pseudo-pressure at a final state;

$m_i$ is a pseudo-pressure at an initial state of the reservoir;

$P_f$ is a pressure of the reservoir at the final state;

$m(\overline{P})$ is an average pseudo-pressure of the matrix block defined as;

$$m(\overline{P}) = \frac{\mu_{ref}Z_{ref}}{P_{ref}} \int_{P_{ref}}^{\overline{P}} \frac{\overline{P}}{\mu Z} d\overline{P},$$

wherein $L_{eq}^{0}$ is an equivalent length of a matrix block of one dimension at the initial time of a transient regime; and $L_{eq}^{ST}$ is an equivalent length of a matrix block of one dimension at a final time of a transient regime.

13. The method as claimed in claim 1, in which the corrective factor for longer term pseudo-permanent exchange regimes in one dimension $\beta_{m-1D}^{LT}(\overline{P})$ or in two dimensions $\beta_{m-2D}^{LT}(\overline{P})$ is written:

by a formula of the type:

$$\beta_{m-1D}^{LT}(\overline{P}) = \beta_{m-2D}^{LT}(\overline{P}) = \frac{P_{ref}/\mu_{ref}Z_{ref}}{\overline{P}/\mu Z} \frac{[m_f - m(\overline{P})]}{[P_f - \overline{P}]}$$

with $P_{ref}$ is a reference pressure;

$\mu_{ref}$ is viscosity at said reference pressure;

$Z_{ref}$ is a compressibility factor of said fluid at said reference pressure;

$\overline{P}$ is an average pressure of a matrix block of said matrix medium;

$\mu$ is viscosity of said fluid at the pressure $\overline{P}$;

$Z$ is a compressibility factor of said fluid at the pressure $\overline{P}$;

$m_f$ is pseudo-pressure at a final state;

m is pseudo-pressure at an initial state of the reservoir;

$P_f$ is pressure of the reservoir at a final state; and $m(\overline{P})$ is an average pseudo-pressure of said matrix block defined by the equation:

$$m(\overline{P}) = \frac{\mu_{ref}Z_{ref}}{P_{ref}} \int_{P_{ref}}^{\overline{P}} \frac{\overline{P}}{\mu Z} d\overline{P}.$$

14. The method as claimed in claim 1, in which prior to step a) a plurality of values of the corrective factors are determined and stored, and in step b), the corrective factor is determined from the stored values.

15. The method as claimed in claim 2, in which prior to step a) a plurality of values of the corrective factors are determined and stored, and in step b), the corrective factor is determined from the stored values.

16. The method as claimed in claim 1, wherein the exchange flow $f_p$ is calculated by from a relationship: $f_p=CP_{mp}\Delta\phi_p$, with C being a geometric coefficient defined by $C=\Delta A \cdot \Delta B \cdot \Delta C \cdot I_V(X)$, with $\Delta A$, $\Delta B$, $\Delta C$ being the dimensions of the mesh, $I_V(X)$ being a shape factor, $\Delta\phi_p$ being a the potential difference and $P_{mp}$ being a property relating to the fluids and to the matrix medium.

17. A computer program product stored non transiently on computer readable medium which is executed by a processor, which performs a method used for developing a fluid deposit traversed by a fracture network based on measurements of properties relating to the fluid deposit, a meshed representation of the fluid deposit is constructed with each mesh of the representation comprising a matrix medium and a fractured medium, and in which an initial pressure of the fluid deposit and a minimum production pressure of the fluid deposit are known, comprising;

a) determining for each mesh an exchange flow that takes place between the matrix medium and the fractured medium;

b) determining exchange flow corrective factors respectively calculated for longer term pseudo-permanent exchange regimes and shorter term transient exchange regimes for correcting the exchange flow by use of the initial pressure of the fluid deposit and the minimum production pressure of the fluid deposit with the exchange flow corrective factors of the exchange flow being obtained by a formulation of pseudo-pressure by formulation of flow equations of the fluid deposit which are determined for the longer term pseudo-permanent exchange regimes and shorter term transient exchange regimes;

c) simulating flows of the fluid in the fluid deposit with a flow simulator, using the exchange flow and the corrective factors and wherein the exchange flow used for the simulation of the flows is multiplied by the exchange flow corrective factors; and d) optimizing the development of the fluid deposit by use of the simulation of the flows in the fluid deposit with the flow simulator; and wherein the longer term pseudo-permanent exchange regimes and shorter term transient exchange regimes are determined from an initial pressure of the fluid deposit and a final pressure of wells drilled during the development of a fluid deposit and transitioning between the longer term pseudo-permanent exchange regimes and shorter term transient exchange regimes which utilizes calculation of an average value of the longer term pseudo-permanent exchange regimes and shorter term transient exchange regimes.

18. A method for the development of a fluid deposit traversed by a fracture network based on measurements of properties relating to the fluid deposit, a meshed representation of the fluid deposit being constructed with each mesh of the representation comprising a matrix medium and a fractured medium, and an initial pressure of the fluid deposit and a minimum production pressure of the fluid deposit being known comprising steps of:
- a) determining for each mesh an exchange flow that takes place between the matrix medium and the fractured medium;
- b) determining exchange flow corrective factors respectively calculated for longer term pseudo-permanent exchange regimes and shorter term transient exchange regimes for correcting the exchange flow by use of the initial pressure of the fluid deposit and the minimum production pressure of the fluid deposit with the exchange flow corrective factors of the exchange flow being obtained by a formulation of pseudo-pressure by formulation of flow equations of the fluid deposit which are determined for the longer term pseudo-permanent exchange regimes and shorter term transient exchange regimes;
- c) simulating flows of the fluid in the fluid deposit with a flow simulator, using the exchange flow and the corrective factors and wherein the exchange flow used for the simulation of the flows is multiplied by the exchange flow corrective factors; and
- d) optimizing the development of the fluid deposit by use of the simulation of the flows in the fluid deposit with the flow simulator; and wherein the longer term pseudo-permanent exchange regimes and shorter term transient exchange regimes are determined from an initial pressure of the fluid deposit and a final pressure of wells drilled during the development of a fluid deposit and transitioning between the longer term pseudo-permanent exchange regimes and shorter term transient exchange regimes which utilizes calculation of an average value of the longer term pseudo-permanent exchange regimes and shorter term transient exchange regimes.

19. The method as claimed in claim 1 wherein steps a) and b) are performed simultaneously.

20. The method as claimed in claim 18 wherein steps a) and b) are performed simultaneously.

* * * * *